Jan. 17, 1939.    H. F. MAYER    2,144,541

EQUIVALENT CAPACITANCE NETWORK

Filed Oct. 22, 1936

Inventor:
Harry F. Mayer;
by Harry E. Dunbar
His Attorney.

Patented Jan. 17, 1939

2,144,541

UNITED STATES PATENT OFFICE 2,144,541

EQUIVALENT CAPACITANCE NETWORK

Harry F. Mayer, Schenectady, N. Y., assignor to General Electric Company, a corporation of New York Application October 22, 1936, Serial No. 106,983

6 Claims. (Cl. 250—40)

My invention relates to alternating current networks wherein electron discharge devices are employed and operated in a manner to add capacitance thereto. With the form of network heretofore employed for this purpose the current passed by the device while having a large reactive component could not be made entirely reactive or substantially so since it has always had an appreciable resistance component. Although this component may be unimportant in many cases, in certain other cases its presence results in serious disadvantages such, for example, as the unnecessary loading of tuned circuits associated with the network.

One object of my invention is the provision of an improved network of this character which will avoid the above-mentioned disadvantages and by which a purely reactive or full 90° displaced current may be obtained. Another object of my invention is the provision of such a network wherein the purely reactive current supplied may be varied in accordance with some variable quantity.

My invention will be better understood from the following description taken in connection with the accompanying drawing, and its scope will be pointed out in the appended claims.

Figure 1:
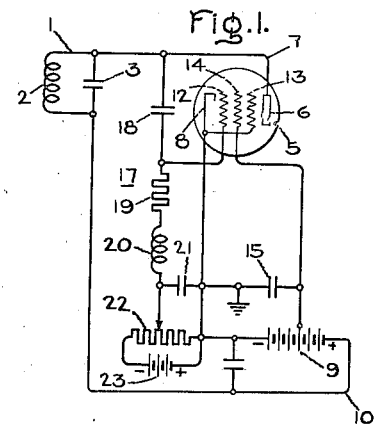
Figure 2:
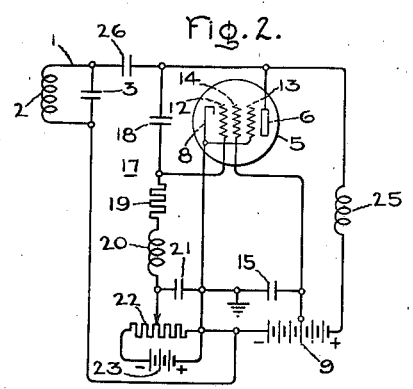
Figure 3:
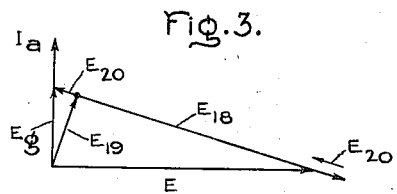

Referring to the drawing, Fig. 1 is a circuit diagram illustrating one embodiment of my invention; Fig. 2 is a similar diagram showing a modification thereof; and Fig. 3 is a vector diagram.

For the purpose of illustration I have shown the network comprising my invention as connected to be supplied by alternating current from the tuned circuit 1 which comprises the winding 2 and the capacitor 3; the network being arranged in shunt with the capacitor. The reactive current passed by the network thus has the same effect as the addition of another capacitor in shunt with the capacitor 3 and therefore comprises an equivalent capacitance network.

The electron discharge device 5 forming a part of the network has its anode 6 connected by the conductor 7 with one side of the tuned circuit 1 and its cathode 8 connected through the anode voltage battery 9 and the conductor 10 with the other side of the tuned circuit, the battery voltage being thereby supplied to the anode through the winding 2 of the tuned circuit. The discharge device 5 has the control grid 12 and is shown having the suppressor grid 13, which is connected as usual with the cathode, and the screen grid 14 which connects with an intermediate point of the battery 9, a suitable by-pass capacitor 15 being shown between the latter grid and the cathode.

Connected between the anode and cathode of the device 5 is the phase shifting circuit 17. This circuit comprises the capacitor 18, which, for example, may have a capacitance of 40 micro-microfarads, the resistor 19, which, for example, may have a resistance of 2000 ohms, the impedance of the capacitor being high with respect to that of the resistor at the alternating current frequency employed and the small reactor 20 whose inductance may, for example, be 160 micro-henries. At a point intermediate the capacitor and the resistor the circuit is connected with the control grid 12 whereby the resistor and the reactor are included in the grid-cathode circuit. I have shown the lower end of the circuit 17 connected with the cathode 8 by means of the by-pass capacitor 21 and the potentiometer 22 across which is connected the biasing battery 23 whereby a variable bias may be applied to the grid 12. It will be understood that the potentiometer is shown merely by way of illustration since the bias voltage applied to the control grid through the circuit 17 may be applied in any desired manner in order to cause the network to function to apply a variable capacitance in shunt with the capacitor 3 in accordance with the bias voltage.

The operation of the phase shifting circuit 17 may be better understood by reference to the vector diagram shown by Fig. 3 where E represents the voltage applied to the circuit 17, $E_{19}$ the voltage across the resistor due to the current advancing effecting of the capacitor 18, and $E_{18}$ the resulting voltage across that capacitor which must be at right angles to $E_{19}$. The voltage $E_{20}$ across the reactor, which voltage is 180° displaced in phase from $E_{18}$, is shown as an extension of $E_{18}$ in the opposite direction. The vectorial sum of $E_{19}$ and $E_{20}$ is $E_g$, the voltage applied to the grid 12 by the circuit. With a reactor having the proper impedance at the frequency employed the angle between E and $E_g$ and hence between E and the anode current $I_a$ of the device 5 may be made exactly 90°. Moreover, if desired, it may be made either greater or less than 90° by suitably changing the value of the reactor 20. It will be understood that Fig. 3 does not truly represent the phase angles obtained with the impedance values mentioned above for the actual phase displacement obtained with the capacitor and resistor alone is somewhat closer to 90° than that shown.

Although the impedance of the circuit 17 is relatively high, the small current which it passes obviously will have a resistance component. To compensate for this the reactor may be made such that the angle between E and Iₐ will be somewhat greater than 90°; however, inasmuch as the passing of a purely reactive current in shunt to the capacitor 3 is not desirable in many cases for stability reasons I may prefer that the current which shunts the capacitor 3 shall have a small resistance component although of much smaller value than could be obtained without the use of my invention.

In view of the above description it is thought that the operation of the apparatus will be apparent without a detailed description thereof. If the voltage applied to the control grid of the device 5 is 90° in advance of the voltage applied to the anode-cathode circuit thereof, the current passed by the device will also be 90° in advance of the anode-cathode voltage. The device then functions like a pure capacitance across the capacitor 3. The value of the reactive current passed by the device is controlled by the adjustment of the potentiometer 22; hence by varying the bias voltage applied to the control grid by changing the adjustment of the potentiometer the resonant frequency of the tuned circuit may be varied at will without loading or objectionably loading the tuned circuit with a resistance component current.

In Fig. 2 I have shown a modified form of my invention which may be preferable in cases where the source of supply of alternating current such as the tuned circuit 1 has one side at low direct current potential. In this form of my invention I connect the positive end of the battery 9 with the anode 6 through the high reactance choke 25. I also employ the bypass capacitor 26 between the tuned circuit and the anode 6. As this form of my invention functions the same as that already described, the description thereof will not be repeated.

I have chosen the particular embodiments described above as illustrative of my invention, and it will be apparent that various other modifications may be made without departing from the spirit and scope of my invention which modifications I aim to cover by the appended claims.

What I claim as new and desire to secure by Letters Patent of the United States, is:

1. An equivalent capacitance network comprising an electron discharge device having an anode, a cathode and a control grid, means for supplying an alternating current to said anode and cathode, a phase shifting circuit connected between said anode and cathode and comprising a capacitor, a resistor and a reactor arranged in series and means connecting said grid with an intermediate point of said circuit, said resistor and reactor being included thereby in the grid circuit of said device and having a low impedance relative to that of the capacitor.

2. An equivalent capacitance network comprising an electron discharge device having an anode, a cathode and a control grid, means for supplying an alternating current to said anode and cathode, a phase shifting circuit connected between said anode and cathode and comprising a capacitor, a resistor and a reactor arranged in series, a connection between said grid and an intermediate point of said circuit, said resistor and reactor being included thereby in the grid circuit of said device and having a low impedance relative to that of the capacitor, and means for supplying a variable voltage between said cathode and said circuit for varying the equivalent capacitance of said network.

3. In combination, a source of alternating current, a grid controlled electron discharge device having its anode-cathode circuit connected to be supplied from said source and means for causing said device to function as a capacitor across said source, said means comprising a capacitor, a resistor, and a reactor connected in a series circuit to be supplied from said source and a connection between said grid and an intermediate point of said circuit, thereby including the resistor and the reactor in the grid circuit of the device, the voltage across said capacitor being high relative to that across said resistor and reactor.

4. In combination, a source of alternating current, a grid controlled electron discharge device having an anode connected with one side of said source and a cathode connected with the other side thereof, a capacitor, a resistor and a reactor arranged in a series circuit, the capacitor being connected with said one side of said source and the reactor being connected with the other side thereof and a connection between said grid and a point of said series circuit intermediate the capacitor and the resistor, the impedance of the capacitor being high relative to that of the resistor and reactor.

5. In combination, a source of oscillations, an electron discharge device having a control grid and having its anode-cathode circuit connected across said source, and means for causing said device to function as a variable capacitor, said means comprising a capacitor, a resistor and a reactor connected in a series circuit across said source, said grid being connected with said series circuit to include the resistor and the reactor in the grid-cathode circuit of the device and means for applying a variable bias voltage to said grid.

6. In combination a tuned circuit, a grid controlled electron discharge device and means for causing said device to add pure capacitance between points of said circuit of unequal potential, said means comprising means for connecting the anode-cathode circuit of said device between said points, a phase shifting circuit connected between said points and comprising a capacitor, a resistor and a reactor in series and a connection between said grid and said circuit whereby the resistor and the reactor are included in the grid circuit of the device.

HARRY F. MAYER.